US007698540B2

(12) United States Patent
Norton et al.

(10) Patent No.: US 7,698,540 B2
(45) Date of Patent: Apr. 13, 2010

(54) DYNAMIC HARDWARE MULTITHREADING AND PARTITIONED HARDWARE MULTITHREADING

(75) Inventors: Scott J. Norton, San Jose, CA (US); Thomas L. Vaden, Neshanle Station, NJ (US); James Callister, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 182 days.

(21) Appl. No.: 11/591,140

(22) Filed: Oct. 31, 2006

(65) Prior Publication Data

US 2008/0114973 A1    May 15, 2008

(51) Int. Cl.
*G06F 9/00* (2006.01)
(52) U.S. Cl. .......................... 712/228; 718/108; 714/10
(58) Field of Classification Search ................. 712/228; 714/24, 10; 718/108
See application file for complete search history.

(56) References Cited

U.S. PATENT DOCUMENTS

| | | | | | |
|---|---|---|---|---|---|
| 5,515,538 | A | * | 5/1996 | Kleiman | 710/260 |
| 5,574,849 | A | * | 11/1996 | Sonnier et al. | 714/12 |
| 5,752,031 | A | * | 5/1998 | Cutler et al. | 718/103 |
| 5,758,184 | A | * | 5/1998 | Lucovsky et al. | 710/6 |
| 5,784,613 | A | * | 7/1998 | Tamirisa | 718/100 |
| 5,784,628 | A | * | 7/1998 | Reneris | 713/300 |
| 5,815,651 | A | * | 9/1998 | Litt | 714/10 |
| 5,920,895 | A | * | 7/1999 | Perazzoli, Jr. et al. | 711/163 |
| 6,487,578 | B2 | * | 11/2002 | Ranganathan | 718/104 |
| 6,631,394 | B1 | * | 10/2003 | Ronkka et al. | 718/100 |
| 7,047,337 | B2 | * | 5/2006 | Armstrong et al. | 710/200 |
| 7,299,336 | B2 | * | 11/2007 | McDonald et al. | 711/206 |
| 7,321,965 | B2 | * | 1/2008 | Kissell | 712/229 |
| 2003/0037089 | A1 | * | 2/2003 | Cota-Robles et al. | 709/1 |
| 2003/0041173 | A1 | * | 2/2003 | Hoyle | 709/248 |
| 2003/0149716 | A1 | * | 8/2003 | Peterson | 709/101 |
| 2004/0107374 | A1 | * | 6/2004 | Cooper et al. | 713/320 |
| 2004/0215939 | A1 | * | 10/2004 | Armstrong et al. | 712/220 |
| 2005/0050305 | A1 | * | 3/2005 | Kissell | 712/220 |
| 2005/0125795 | A1 | * | 6/2005 | Kissell | 718/100 |
| 2005/0172164 | A1 | * | 8/2005 | Fox et al. | 714/13 |
| 2005/0193278 | A1 | * | 9/2005 | Hammarlund et al. | 714/47 |
| 2005/0198635 | A1 | * | 9/2005 | Olszewski et al. | 718/100 |
| 2006/0080660 | A1 | * | 4/2006 | Radhakrishnan | 718/100 |
| 2006/0095909 | A1 | | 5/2006 | Norton et al. | |
| 2006/0117316 | A1 | | 6/2006 | Cismas et al. | |
| 2006/0129789 | A1 | * | 6/2006 | Chu et al. | 713/1 |
| 2006/0136919 | A1 | * | 6/2006 | Aingaran et al. | 718/100 |
| 2006/0161421 | A1 | * | 7/2006 | Kissell | 703/26 |
| 2006/0168254 | A1 | | 7/2006 | Norton et al. | |
| 2006/0242389 | A1 | * | 10/2006 | Browning et al. | 712/229 |

(Continued)

OTHER PUBLICATIONS

"HP-UX process Management", White paper, Version 1.3, Published Apr. 7, 1997, Hewlett-Packard Company.*

(Continued)

*Primary Examiner*—Eddie P Chan
*Assistant Examiner*—Idriss N Alrobaye (57) ABSTRACT

In an embodiment of the invention, a method for dynamic hardware multithreading, includes: using a hardware halt function or a hardware yield function in a processor core in order to enable or disable a hardware thread that shares the core; wherein the hardware thread is disabled by placing the hardware thread in a halt state or yield state, and allowing another hardware thread to utilize the core.

18 Claims, 6 Drawing Sheets

U.S. PATENT DOCUMENTS

2007/0048723 A1*  3/2007  Brewer et al. ............... 434/350
2007/0094664 A1*  4/2007  So et al. ..................... 718/103
2007/0300227 A1* 12/2007  Mall et al. .................. 718/102

OTHER PUBLICATIONS

Multithreading in the Solaris Operating Environemnt, A Technical White paper, Sun Microsystems (2002).*

Multithreaded Programming Guide, 1994 Sun Microsystems, Inc.*

Operating System Support for simultaneous multithreaded Processors, James R. Bulpin, Technical Report, University of Cambridge, Feb. 2005.*

Windows Platform Design Notes, Windows Support for Hyper-Threading Technology, 2002 Microsoft Corporation.*

Hyper-threading technology architecture and microarchitecture—Marr—2002, Desktop Products Group, Intel Corp.*

* cited by examiner

DYNAMIC HARDWARE MULTITHREADING AND PARTITIONED HARDWARE MULTITHREADING

TECHNICAL FIELD

Embodiments of the invention relate generally to dynamic hardware multithreading and partitioned hardware multithreading.

BACKGROUND

A multi-core processor architecture is implemented by a single processor that plugs directly into a single processor socket, and that single processor will have one or more "processor cores". Those skilled in the art also refer to processor cores as "CPU cores". The operating system perceives each processor core as a discrete logical processor. A multi-core processor can perform more work within a given clock cycle because computational work is spread over to the multiple processor cores.

Hardware threads are the one or more computational objects that share the resources of a core but architecturally look like a core from an application program's viewpoint. As noted above, a core is the one or more computational engines in a processor. Hardware multithreading (also known as HyperThreading) is a technology that allows a processor core to act like two or more separate "logical processors" or "computational objects" to the operating system and the application programs that use the processor core. In other words, when performing the multithreading process, a processor core executes, for example, two hardware threads (streams) of instructions sent by the operating system, and the processor core appears to be two separate logical processors to the operating system. The processor core can perform more work during each clock cycle by executing multiple hardware threads. Each hardware thread typically has its own thread state, registers, stack pointer, and program counter.

Current processors with the multithreaded processor cores such as, e.g., the dual-core, dual-threaded MONTECITO ITANIUM processor chip from INTEL CORPORATION, do not allow hardware multithreading to be enabled or disabled dynamically in the multithreaded processor cores without first performing a system reset (i.e., reboot of the operating system and reset of the computing machine hardware). This limitation can cause system availability problems and uptime problems when the system administrator needs to change the behavior of multithreaded processor cores (i.e., when the system administrator needs to temporarily enable or disable the hardware multithreading).

Current hardware multithreading technology also uses an "all or nothing" approach to hardware multithreading. This current approach requires hardware multithreading to be enabled or disable for an entire operating system instance. In other words, all processor cores in an operating system instance are multithreaded, or all processor cores in the operating system instance are not multithreaded. A drawback of this current approach is that not all applications receive a performance benefit when the applications use the multithreaded processor cores. Some applications may be subject to some performance degradation when using multithreaded processor cores. This current approach is problematic when a system administrator wants to run a mix of applications on an operating system instance, and those applications have different needs/requirements with respect to multithreaded processor cores. To solve this problem, the system administrator can provide an additional operating system instance without the multithreaded processor cores and then to match up the applications that require multithreading with the operating system instance with the multithreaded processor cores and to match up the applications that do not require multithreading with the operating system instance without the multithreaded processor cores. However, this solution disadvantageously requires additional memory spaces, software, and costs because two separate operating system instances are installed in the computer system.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
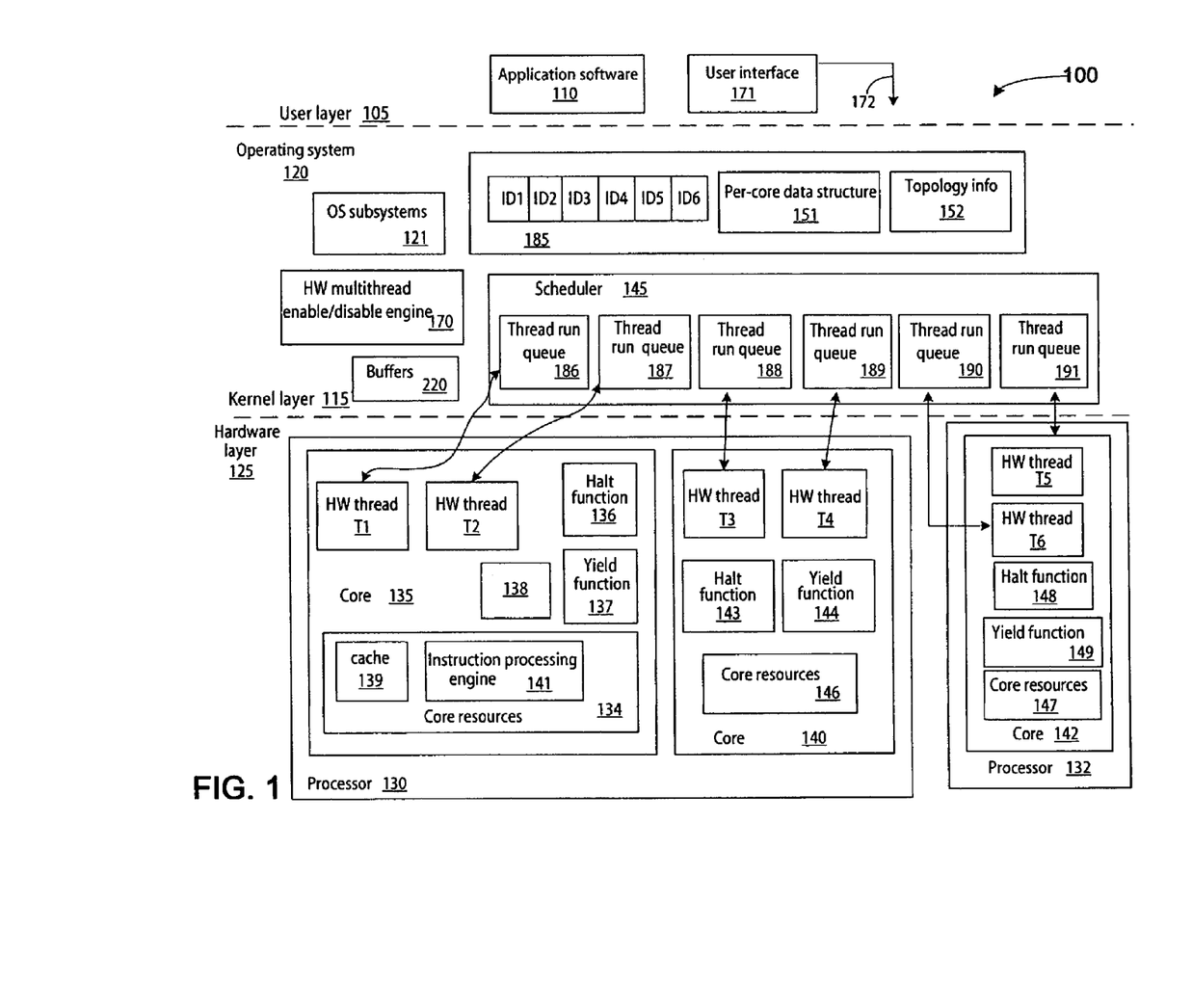
FIG. 1 is a block diagram of a system (apparatus) in accordance with an embodiment of the invention.

FIG. 1 is a block diagram of a system (apparatus) 100 in accordance with an embodiment of the invention. The system 100 is typically a computer system that is in a computing device. A user layer 105 will have an application software 110 that will run in the system 100. A kernel layer 115 includes an operating system 120 with various features described below to enable and disable hardware multithreading on a processor core. A hardware layer 125 includes a processor 130 with multiple processor cores. A processor 132 with a single core 142 may also be in the hardware layer 125. In the example of FIG. 1, the processor 130 includes the processor cores 135 and 140, although the cores in the processor 130 may vary in number in other examples. Also, the number of processors may vary in other examples. For example, one or more additional processors 132 may be present in the hardware layer 125.

It is further noted that the kernel layer 115 may include other known operating system subsystems 121 such as, for example, a virtual memory subsystem, I/O subsystem, file subsystem, networking subsystem, process management subsystem, and/or other known subsystems that permit the operating system 120 to perform various known functions. The kernel layer 115 also has various data 185 including kernel data structures to permit the OS 120 operations.

In accordance with an embodiment of the invention, hardware supported functions such as, for example, a halt function or a yield function are used to dynamically enable or disable hardware threading on a per-core basis. The hardware threads can be enabled or disabled to dynamically enable or disable hardware multi-threading on a per-core basis as discussed in the examples below. Therefore, an embodiment of the invention permits multithreading enabling and disabling to be performed on standard hardware that does not support dynamically enabling and disabling of hardware threads on a per-core basis. When a hardware thread is enabled, the hardware thread will share the resources of a core. For example, the core 135 has resources 134 which include, for example, a cache 139, instruction processing engine 141, and other known core resources. When a hardware thread is disabled, the hardware thread will be placed in a halt state or a yield state, as discussed below. Therefore, an embodiment of the invention permits a core to be hardware multi-threaded enabled which means that all hardware threads in a core are enabled or are hardware multi-threaded disabled which means that only one hardware thread is enabled and other hardware threads are disabled in the core.

The halt function (e.g., block 136) places a hardware thread in a halt state where the hardware thread is completely stopped and is therefore not consuming resources of the core. The yield function (e.g., block 137) places, for example, a hardware thread T1 in a yield state where the hardware thread T1 is consuming so few CPU clock cycles in a yield loop that the hardware thread T1 is essentially stopped, allowing the sibling hardware thread T2 (in the same core 135) to consume all the resources 134 of the core. Additionally or alternatively, the yield function places a hardware thread in a yield state where the hardware thread is placed in a yield loop and consumes few resources of the core and performs yields to the sibling hardware thread and does not require operating system visibility.

The command 172 from the user interface 171 will identify (to the OS 120) about the particular hardware threads to be disabled in the particular cores.

An example is now discussed for switching a core from hardware multithreaded disabled to hardware multithreaded enabled. Assume that the hardware thread T2 was previously in a halt state or a yield state and the hardware thread T1 is enabled. The resume function 138 is used to remove the hardware thread T2 from the halt state or yield state, respectively. As a result, the core 135 will become hardware multi-threaded enabled because the hardware threads T1 and T2 are both enabled.

The operations of the halt function and the yield function are initiated, for example, by function calls from the operating system 120. The OS function calls are performed in response to function calls 172 from the user interface 171.

To dynamically enable or disable the hardware multi-threading for a core means that hardware multithreading can be enabled or disabled during runtime of system 100, and system reset is not required in order to enable or disable hardware multithreading. This feature of an embodiment of the invention advantageously results in less system downtime for the customer when the customer needs to change the multithreading settings (i.e., when a customer has to enable or disable the multithreading) because operating system reboot and system reset is not required. In contrast, previous systems do not enable or disable hardware multithreading at the core level. Previous systems also require a system reset or OS reboot before hardware multithreading is disabled at a system-wide level.

An example halt function is the PAL_HALT_LIGHT function which places a hardware thread in a halt state in the Intel MONTECITO family of multithreaded CPU cores as known to those skilled in the art. An example yield function is the hint@pause instructions which trigger a hardware thread to yield execution to another hardware thread of the core as known to those skilled in the art. Other suitable types of halt functions or yield functions may be used, depending on the OS type and hardware type.

Similarly, the hardware threads T3 and T4 (that share core resources 146 in core 140) can be dynamically enabled or disabled by use of a halt function 143 or yield function 144, and the hardware threads T5 and T6 (that share core resources 147 in core 142) can be dynamically enabled or disabled by use of a halt function 143 or yield function 144.

In an embodiment of the invention, the hardware thread to be disabled is also removed from the view of the operating system 120. The hardware thread may be removed from the OS view before the hardware thread is placed in the halt state or yield state, or the hardware thread may be placed in the halt state or yield state and the hardware thread is then removed from the view of the operating system 120. Alternatively, a requirement is not imposed on the order of placing the hardware thread in the disabled state and removing the hardware thread from the OS view.

In an embodiment of the invention, when a disabled hardware thread is subsequently enabled, the hardware thread is also placed in the OS view. The hardware thread may be placed in the OS view before the hardware thread is removed from the halt state or yield state, or the hardware thread may be removed from the halt state or yield state and the hardware thread is then placed in the view of the operating system 120. Alternatively, a requirement is not imposed on the order of removing the hardware thread from the disabled state and placing the hardware thread in the OS view.

The OS data 185 includes data structures that are thread-specific and core-based. For the hardware threads that share the core 135, hardware thread T1 will, for example, have a CPU ID of ID1 and hardware thread T2 will have a CPU ID of ID2. For the hardware threads that share the core 140, hardware thread T3 will have a CPU ID of ID3 and hardware thread T4 will have a CPU ID of ID4. For the hardware threads that share the core 142, hardware thread T5 will have a CPU ID of ID5 and hardware thread T6 will have a CPU ID of ID6.

The OS 120 will select and retain one CPU ID from each core. These retained CPU IDs will represent the remaining hardware threads that will use a processor core after hardware multithreading is dynamically disabled. For example, assume that the OS 120 retains ID1, ID3 and ID5 so that hardware threads T1, T3, and T5 will be the remaining hardware threads that will share the cores 135, 140, and 142, respectively. This step will remove all reference to the hardware threads to be removed from the operating system's view and a user application's view. As a result, the hardware thread is being removed from the pool of schedulable hardware processing objects that are contained in the operating system 120. These schedulable objects are used by the scheduler 145 when determining where to execute a software thread. The OS 120 removes the hardware threads from the operating system's view by various actions including, but not limited to, for example, moving scheduled applications to other cores in other processors, removing local CPU run queues (e.g., the OS 120 will disable the run queues 187, 189, and 191 of software threads to be executed by hardware threads T2, T4, and T6 to be disabled), removing any per-hardware-thread data structures (n the per-core data structure 151) that the operating system 120 maintains, and removing the hardware thread information from topology information 152 that the operating system 120 exposes. The engine 170 can store the removed per-hardware-thread data structure and hardware thread information in the topology 152, for example, in buffers 220. When the OS 120 will subsequently permit hardware multithreading again on the cores, the OS 120 can obtain the per-hardware-thread data structures from the buffers 220 of the disabled (halted or yielded state) hardware threads. The number of actions that need to be taken in order to remove a hardware thread from the view of the operating system are highly dependent upon the internal design of the operating system. Therefore, variations are possible in the above steps for removing a hardware thread from the view of the operating system.

When hardware multithreading is to be subsequently enabled for a core, the reverse of the above procedure is followed. The OS 120 will place all disabled hardware threads in the operating system's view and user applications' view. For example, the OS 120 will re-allocate all of the per-hardware-thread data structures, will create or enable the local CPU run queues, and place the hardware thread information back into the topology information that the operating system exposes, and allow the previously disabled hardware threads to again be placed in the pool of schedulable hardware processing objects that are scheduled for processing by the scheduler 145. All removal operations previously performed in order to hide a hardware thread from the operating system's view are undone, and the particular steps in this undo process will depend on the features of the particular type of operating system 120.

As an alternative to the above embodiment, a multithread enable/disable engine 170, which is an OS-based engine, can also be used to enabled or disabled hardware multithreads on a per-core basis.

A system administrator can, for example, use a user interface 171 to send function calls 172 to the multithread enable/disable engine 170. The function calls 172 specifies which processor cores (e.g., cores 135 and 140 in processor 130) and/or core 142 in processor 132 will be enabled or disabled for hardware multithreading, as discussed in detail below.

Assume that the operating system 120 is running with hardware multithreading enabled, for example, on each of the cores 135 and 140. Typically, the operating system 120 is initially booted with hardware multithreading enabled at the processor cores at the hardware layer 125. With multithreading enabled in the cores, the hardware thread T1 and hardware thread T2 remove a software thread from the software thread run queues 186 and 187, respectively, and execute that software thread. Similarly, the hardware thread T3 and hardware thread T4 remove a software thread from the software thread run queues 188 and 189, respectively, and execute that software thread. If the processor 132 is installed in the hardware layer 125, then the hardware thread T5 and hardware thread T6 remove a software thread from the software thread run queues 190 and 191, respectively, and execute that software thread.

Assume now that the system administrator will intend to disable the hardware multithreading in the cores 135 and 140 because, for example, the application software 110 can efficiently run on processors cores without the hardware multithreading feature. The multithreaded enable/disable engine 170 will access the system data 185 in the kernel layer 115, in order determine the CPU ID (CPU identifier) of each hardware thread in each processor core.

In response to a function call 172, the engine 170 will disable multithreading for a core by allowing one hardware thread to use all of the resources of that core and placing the other hardware threads that share that core into a halt or yield state. For convenience in terminology, the terms "halt" or "halted" is also defined herein as halt or yield. The various particular steps discussed below can be performed by using the halt functions of hardware or yield functions of hardware. In the halt or yield state, hardware threads are either completely stopped or are consuming so few CPU clock cycles in a yield loop that the hardware thread is essentially stopped allowing the sibling hardware thread to consume all the resources of the core. The engine 170 will select and retain one CPU ID from each core. These retained CPU IDs will represent the remaining hardware threads that will use a processor core after hardware multithreading is dynamically disabled. For example, assume that the engine 170 retains ID1, ID3 and ID5 so that hardware threads T1, T3, and T5 will be the remaining hardware threads that will use the cores 135, 140, and 142, respectively.

In this example, the hardware threads T2, T4, and T6 represented by the other CPU IDs ID2, ID4, and ID6, respectively, are removed from the operating system's view. This step will remove all reference to the hardware threads to be removed from the operating system's view. As a result of removing a hardware thread from the operating system's view, the hardware thread is being removed from the pool of schedulable hardware processing objects that are contained in the operating system 120. These schedulable objects are used by the scheduler 145 when determining where to execute a software thread (FIG. 1). The engine 170 removes the hardware threads from the operating system's view by various actions including, as similarly described above.

After a hardware thread has been removed from the view of the operating system 120, the hardware thread needs to be temporarily stopped or disabled. Note that the order of placing the hardware thread into the halt or yield state and removing the hardware thread from the OS view may vary. In an embodiment of the invention, the engine 170 places the hardware thread to be disabled in a tight spinning loop (yield loop) by calling a hardware yield function to allow the remaining hardware thread (or threads) to consume the entire resource of the processor core or by calling a hardware halt function to halt the hardware thread. Therefore, in the example of FIG. 1, the engine 170 will call the hardware halt function 136 or the hardware yield function 137 which places hardware thread T2 in a halt or yield state, respectively, so that the remaining hardware thread T1 will use the entire resource of the core 135. Similar operations are performed to place other hardware threads in other cores into the halt state or yield state. When the yield function places a hardware thread in the yield state, the hardware thread will not remove a software thread from a thread run queue and will not execute the software thread. The hardware threads in the halt state or yield state will remain in this halt state or yield loop, respectively, until a dynamic hardware multithreading enable call is made via another function call 172. This enable call will cause the engine 170 to take the halted hardware thread(s) out of the yield loop and permit the hardware thread(s) to again use a core. Since more than one hardware thread will be able to use the core, hardware multithreading in the core is again enabled.

Note that once all selected CPU IDs have been removed from the view of the operating system 120, and the CPU IDs' corresponding hardware threads have been placed in the yield loop or in the halt state, hardware multithreading has been disabled. As a result, only one hardware thread from each processor core is essentially executing and consuming the entire resources of the processor core. Depending on how the yield function implements the hardware's yield operation, the disabled hardware threads are either completely stopped or are consuming so few CPU clock cycles in the yield loop that these hardware threads are essentially stopped. Therefore, the hardware threads that are not disabled can use all of the resources of the cores.

When hardware multithreading is to be subsequently enabled for a core, the reverse of the above procedure is followed. The engine 170 will place all disabled hardware threads in the operating-system's view. The method for placing a hardware thread into the operating system's view has been similarly discussed above.

Once the operating system 120 has a complete view of all the hardware threads, represented by CPU IDs again, then the engine 170 will remove each of the halted hardware threads from the yield loop or halt state. Note that the order of removing the disabled hardware thread from the halt or yield state and placing the hardware thread in the OS view may vary. In the example of FIG. 1, the engine 170 will call the yield function to disable the yield loop (or will call the halt function to remove the hardware thread from the halt state). Upon leaving this yield loop or halt state, the hardware threads will start removing software threads from the run queues to be executed by the cores. Each of the cores 135, 140, and 142 can again execute multiple hardware threads.

An embodiment of the invention permits hardware multithreading to be dynamically enabled and disabled for a core even if the hardware of the computer may not support that feature of dynamic enabling and disabling of hardware multithreading. Furthermore, an embodiment of the invention can permit multithreading to be enabled or disabled for a core without the requirement of an operating system reboot or a system reset.

Figure 2:
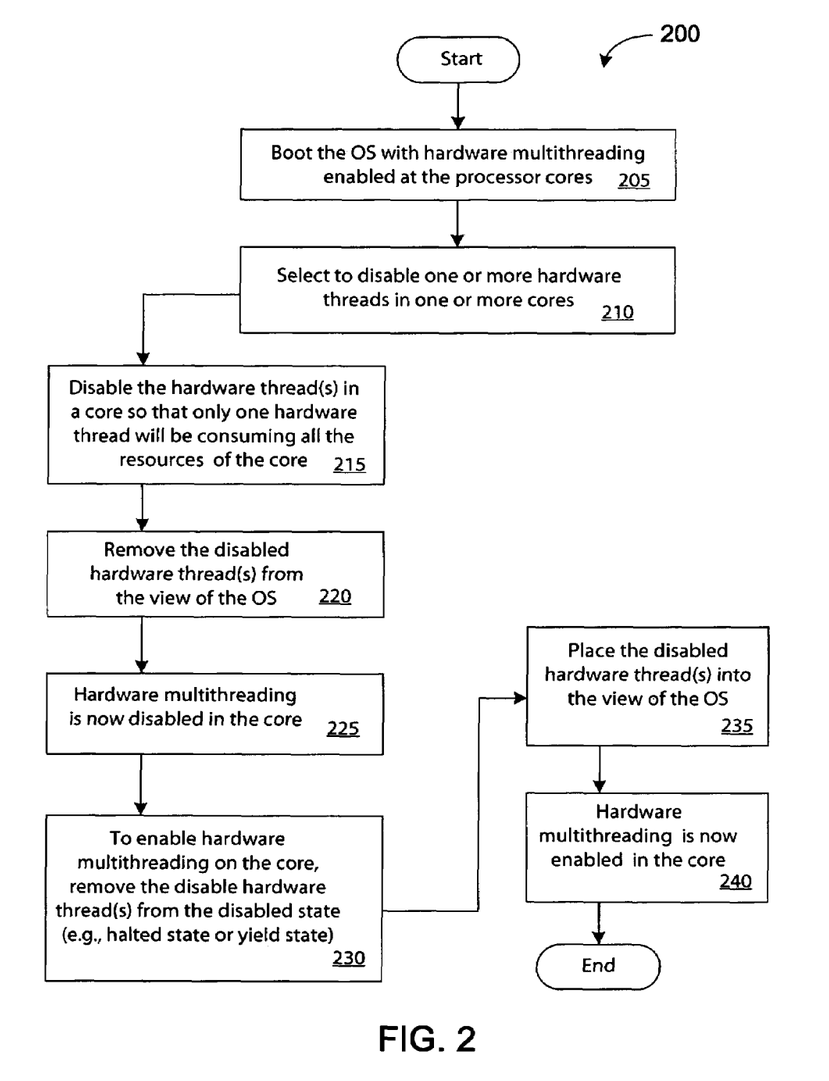
FIG. 2 is a flow diagram that illustrates a method, in accordance with an embodiment of the invention.

FIG. 2 is a flow diagram of a method 200 in accordance with an embodiment of the invention. In block 205, the operating system 120 is initially booted with hardware multithreading enabled at the processor cores. In block 210, one or more hardware thread(s) in one or more cores are selected to be disabled. For example, the CPU ID of the hardware thread to remain as enabled is selected, and the CPU ID(s) of hardware thread(s) to be disabled is selected.

Note that the order of blocks 215 and 220 may vary. In block 215, one or more hardware threads in a core are disabled so that only one hardware thread will be consuming all the resources of the core. To disable a hardware thread, the hardware halt function or the hardware yield function can be used to place a hardware thread in a halt state or yield state. In block 220, the hardware threads that have been disabled (or to be disabled) are removed from the view of the OS.

In block 225, hardware multithreading is disabled in a core after performing the steps in blocks 215 and 220, since only one hardware thread in the core is enabled.

Blocks 230 to 240 show the steps for enabling hardware multithreading on a core. Note that the order of blocks 230 and 235 may vary. In block 230, the one or more hardware threads that are disabled are removed from the disabled state (halted state or yield state). The hardware halt function or the hardware yield function can be used to remove a hardware thread in from the disabled state. In block 235, the hardware threads that have been removed from the disabled state are placed into the view of the OS.

In block 240, hardware multithreading is enabled in a core after performing the steps in blocks 230 and 240, since more than one hardware thread in the core is enabled.

Figure 3:
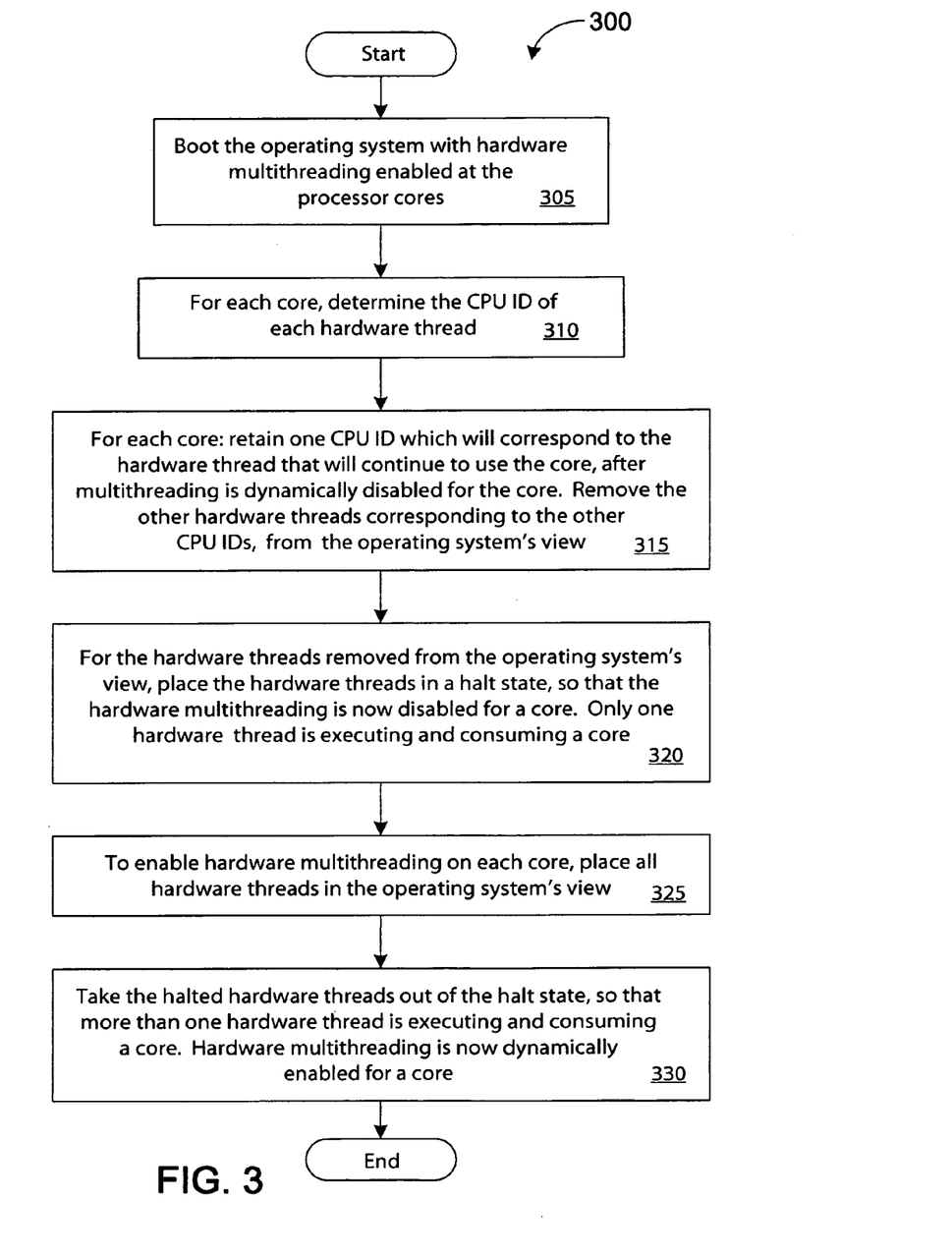
FIG. 3 is a flow diagram of a method in accordance with another embodiment of the invention.

FIG. 3 is a flow diagram of a method 300 in accordance with another embodiment of the invention. The method 300 permits hardware multithreading to be dynamically enabled or disabled for a processor core. In block 305, the operating system 120 is initially booted with hardware multithreading enabled at the processor cores.

In block 310, for each processor core, the CPU ID of each hardware thread is determined or identified.

In block 315, for each core, the following steps are performed. One CPU ID is retained for each core, where the CPU ID will correspond to the hardware thread that will continue to use the core if multithreading is dynamically disabled for the core. The other hardware threads corresponding to the other CPU IDs are removed from the operating system's view.

In block 320, for hardware threads that are removed from the operating system's view, these hardware threads are placed in a halt or yield state, so that hardware multithreading is now disabled for a processor core. Only one hardware thread is executing and consuming a core. Note that the order of placing a hardware thread in a disabled state and removing the hardware thread from the OS view may vary.

In block 325, in order to subsequently enable hardware multithreading on each core, all hardware threads (including the currently halted threads or threads in a yield state) are placed in the operating system's view.

In block 330, the halted hardware threads are taken out of (removed from) the halt or yield state, so that more than one hardware thread is executing and sharing the resources of a processor core. Hardware multithreading is now dynamically enabled for a core. Note that the order of removing a hardware thread in a disabled state and placing the hardware thread into the OS view may vary.

Figure 4:
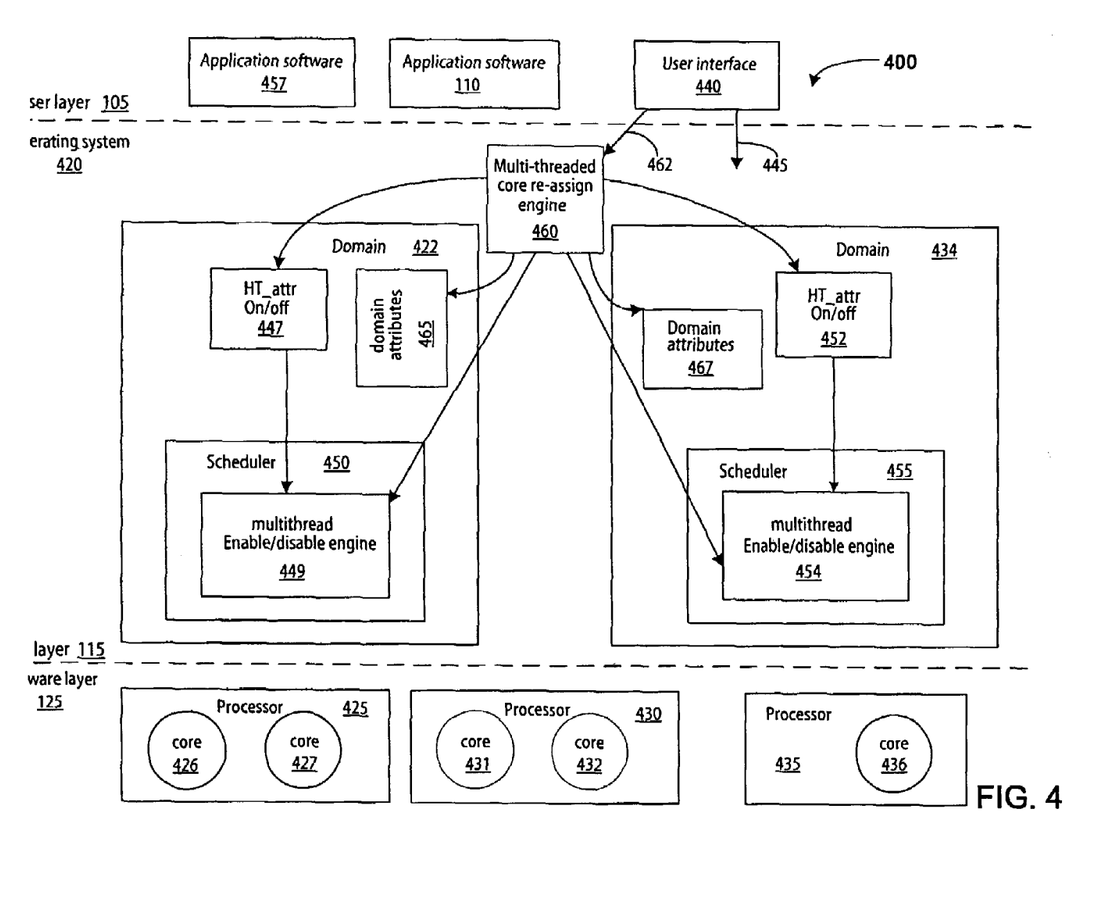
FIG. 4 is a block diagram of a system (apparatus) in accordance with another embodiment of the invention.

FIG. 4 is a block diagram of a system (apparatus) 400 in accordance with another embodiment of the invention. In the system 400, scheduling allocation domains have multithreaded processor cores that can be dynamically enabled or disabled, so that multithreading is enabled or disabled within all processor cores of a scheduling allocation domains rather than within the entire system 400, as further described below. A scheduling allocation domain can be implemented by, for example, processor sets (PSETs) that partitions the processors into multiple PSETS. Each PSET may have any number of processors. Applications executing on the computer system are assigned to a specific PSET. An application that is assigned to execute in a particular PSET may have its software threads execute on the processing resources of processor cores in that particular PSET, but its software threads do not execute on processor cores in other PSETs.

The system 400 allows an operating system instance to partition the processor cores into different scheduling allocation domains, where some scheduling allocation domains can be set to contain multithreaded processor cores while other scheduling allocation domains can be set to contain single-threaded processor cores. The processor cores can be set to multithreaded enabled or multithreaded disabled (e.g., single-threaded), by dynamically enabling or disabling hardware threads that share the cores, as described by the method performed in FIGS. 1-3 above. Alternatively, the hardware halt function and hardware yield function (hardware supported functions), as discussed in FIGS. 1 and 2 above, can be used to enable or disable the hardware multithreading in a per-core basis. Another alternative would be for the hardware itself to enable or disable hardware multithreading by use of standard hardware switching mechanisms.

In the example of FIG. 4, two scheduling allocation domains 422 and 424 are implemented in the operating system 420. However, the number of scheduling allocation domains may vary in an operating system. The domain 422 has the processor 425 with cores 426 and 427 and the processor 430 with cores 431 and 432. The domain 424 has the processor 435 with core 436. The number of processors in a domain and the number of cores in a processor may vary in other examples.

These scheduling allocation domains also typically require that an application software be migrated to (i.e., started in) a domain. Applications running in a domain are restricted to using the processor cores in that domain. Therefore, scheduling allocation domains permit an operating system 420 to partition sets of processor cores to execute applications that are assigned to particular domains. Scheduling allocation domains are also described in the POSIX (Portable Operating System Interface) standards which are the IEEE standards describing a set of standard operating system operating interfaces based on the UNIX operating system.

An attribute (HT_attr) is added to each scheduling allocation domain. Note that the attribute can be set to other notations, and the HT_attr notation is just one example. This attribute can be set to one of two values (e.g., ON or OFF). These values indicate whether or not the processor cores contained within a scheduling allocation domain would have hardware multithreading enabled (i.e., two or more hardware threads on a processor core) or disabled (one hardware thread on a processor core).

The HT_attr attribute is dynamically changeable by the system administrator during system run time by use of, for example, a user interface 440. At any time, a system administrator can make an attribute call 445 (e.g., pset_set_attr( )) that will change the HT_attr value from ON to OFF or vice versa. This attribute call 445 will cause all of the processor cores within that scheduling allocation domain to change to multithreaded or single threaded in order to match the HT_attr value.

In the example of FIG. 4, if the attribute call 445 sets the attribute 447 to OFF in the domain 422, then the multithread enable/disable engine 449 in the scheduler 450 will halt (or yield) various hardware threads so that each of the cores 426 and 427 in processor 425 and the cores 431 and 432 in processor 430 will become single-threaded. The enabling and disabling of hardware threads was previously discussed above with reference to FIGS. 1-3. Alternatively, the hardware halt function and hardware yield function (hardware supported functions), as discussed in FIGS. 1 and 2 above, can be used to enable or disable the hardware multithreading in a per-core basis. Another alternative would be for the hardware itself to enable or disable hardware multithreading. Therefore, if an application 110 can run with improved performance on cores that are single threaded, then that application 110 will be assigned to the domain 422 with cores that have hardware multithreading disabled. The user can optionally make another attribute call 445 in the future to set the attribute value 447 to ON, so that the multithread enable/disable engine 449 will un-halt various hardware threads so that each of the cores 426 and 427 in processor 425 and the cores 431 and 432 in processor 430 will become multithreaded.

In the example of FIG. 4, if the attribute call 445 sets the attribute 452 to ON in the domain 424 (assuming that the attribute 452 was previously OFF), then the multithread enable/disable engine 454 in the scheduler 455 will un-halt one or more hardware threads if the core 436 is running with only one hardware thread and has one or more other hardware threads that are halted. As a result, the attribute 452 with the ON value will permit the core 436 to become multithreaded. In the alternative embodiment, the OS 120 will invoke the hardware halt functions or the hardware yield functions in each core to enable or disable hardware multithreading for each core in the domain. Therefore, as a benefit provided by an embodiment of the invention, if an application 457 can run with improved performance on cores that are multithreaded, then that application 457 will be assigned to the domain 424 with cores that have hardware multithreading enabled. Therefore, the attribute values in each scheduling allocation domain can switch the processor cores in the domain from being multithreaded to single-threaded or from being single-threaded to multithreaded.

Embodiments of the invention advantageously permit applications (that have different requirements for optimal performance and/or correct behavior with respect to multithreaded processor cores) to co-exist in the same operating system instance 420, because cores in a domain can be set to multithreading and cores in another domain can be set to single-threading. Because the attribute calls 445 permits a dynamic enabling or disabling of multithreading for each domain, the system 400 can be dynamically changed to the needs of current applications without requiring a system reboot or reset and system un-availability. By providing schedule allocation domains that have a multithreaded processor core attributes so that hardware threading can be enabled or disabled for cores at the scheduling allocation domain boundary (rather than for cores at the entire operating system boundary), mixed applications that have different needs or requirements with respect to multithreaded CPU cores can be run on the same operating system instance 420. Therefore, a system administrator will not be required to install an additional operating system instance with single threaded processor cores.

In another embodiment of the invention, additionally or alternatively, the system 400 includes a multithreaded core re-assign engine 460 that permits a core in a scheduling allocation domain to be re-assigned to another scheduling allocation domain. When a system administrator makes a core re-assign call 462, the call 462 specifies the core in a first domain that will be re-assigned to a second domain. For example, assume that the system administrator will re-assign the core 432 from the schedule allocation domain 422 to the schedule allocation domain 424. The core re-assign engine 460 determines the attributes of the core 432 from the domain attributes 465. The core re-assign engine 460 also determines the attributes of the domain 424. The core re-assign engine 460 will modify the domain attributes 465 and 467 so that the operating system 420 will view the core 432 as belonging to the domain 424 instead of belonging to its previous domain 422. The attributes that are modified includes, for example, per-core data structure, topology information, run queue information, software thread dispatcher data structures, and scheduler data structures.

Similar to having pset attributes/data, there are also have per-core (or per-processor) attributes/data in a domain. This contains a pset/domain ID to link the core/cpu to a specific domain. Additionally, in the HP-UX operating system which is commercially available from HEWLETT-PACKARD COMPANY, each pset/domain contains a list of all cores/processors contained within the pset/domain.

Additionally, the core re-assign engine 460 can read the attributes 447 and 452 in the domains 422 and 424, respectively. If the attribute 452 in the new domain 424 has an OFF value, then the core re-assign engine 460 will signal the multithread enable/disable engine 449 to halt one or more hardware threads for the core 432 so that the core 432 will become single-threaded. If the attribute 452 in the new domain 424 has an ON value, then the core re-assign engine 460 will signal the multithread enable/disable engine 449 to un-halt one or more hardware threads for the core 432 (if only a single hardware thread is running in the core 432) so that the core 432 will become multithreaded. Since the core 432 has been re-assigned to domain 424, the core 432 will run software threads for an application software that is assigned to the domain 424. In an alternative embodiment, the hardware halt functions and hardware yield functions are used to enable or disable the hardware multithreading on a per-core basis. Another alternative would be for the hardware itself to enable or disable hardware multithreading.

The core re-assign engine 460 can similarly re-assign other cores to other domains. For example, the core re-assign engine 460 can re-assign the core 436 from the domain 424 to the domain 422.

Figure 5:
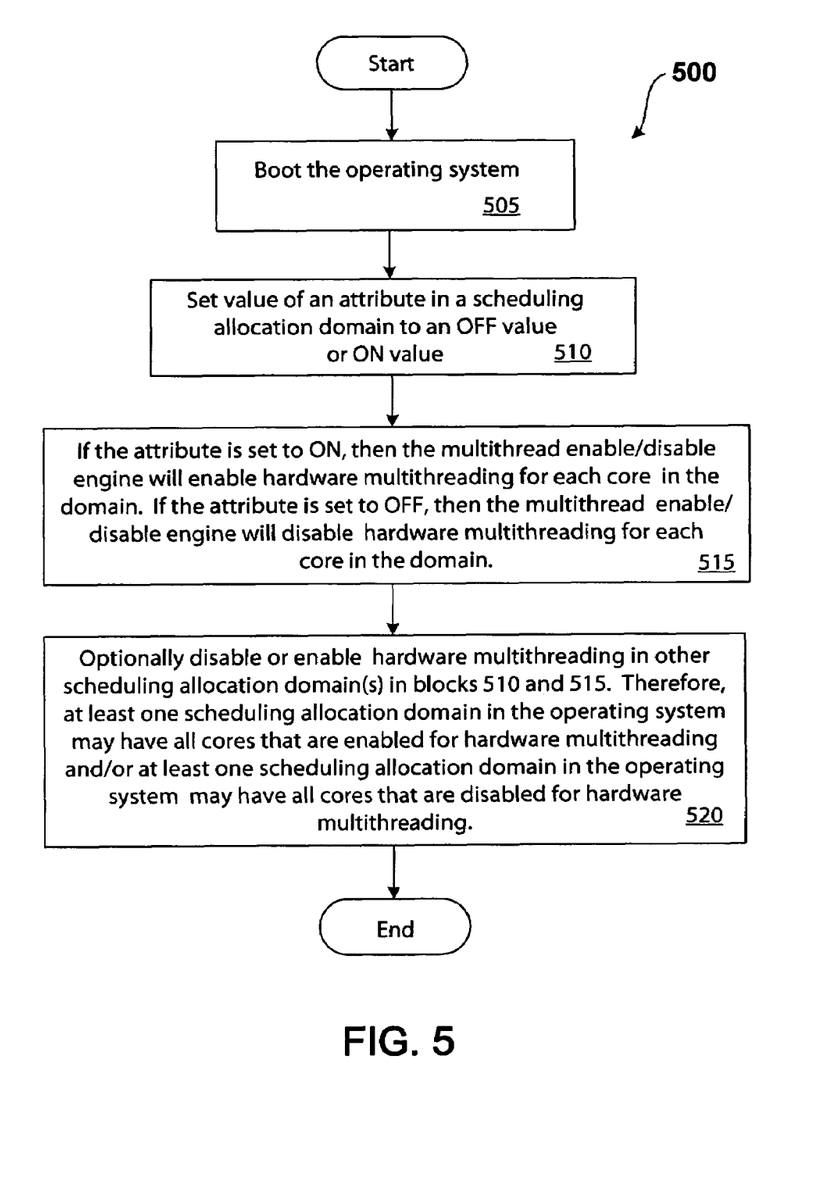
FIG. 5 is a flow diagram of a method in accordance with another embodiment of the invention.

FIG. 5 is a flow diagram of a method 500 in accordance with another embodiment of the invention. The method 500 permits all processor cores in a scheduling allocation domain to be enabled or disabled for hardware multithreading. In block 505, the operating system 420 is booted.

In block 510, the system administrator can set a value of an attribute in a scheduling allocation domain in an ON value (i.e., first value) or an OFF value (i.e., second value).

In block 515, if the attribute is set to ON, then the multithread enable/disable engine will enable hardware multithreading for each core in the scheduling allocation domain. For example, the multithreading enable/disable engine may un-halt one or more hardware threads so that a core can run multiple hardware threads. If the attribute is set to OFF, then the multithread enable/disable engine will disable hardware multithreading for each core in the scheduling allocation domain. For example, the multithreading enable/disable engine may halt one or more hardware threads so that a core runs a single hardware thread. In an alternative embodiment, the hardware halt functions and hardware yield functions are used to enable or disable the hardware multithreading on a per-core basis. Another alternative would be for the hardware itself to enable or disable hardware multithreading.

In block 520, the administrator can optionally disable or enable hardware multithreading in other scheduling allocation domain(s), by repeating the same steps in blocks 510 and 515. Therefore, at least one scheduling allocation domain in the operating system may have all cores that are enabled for hardware multithreading and/or at least one scheduling allocation domain in the operating system may have all cores that are disabled for hardware multithreading.

Figure 6:
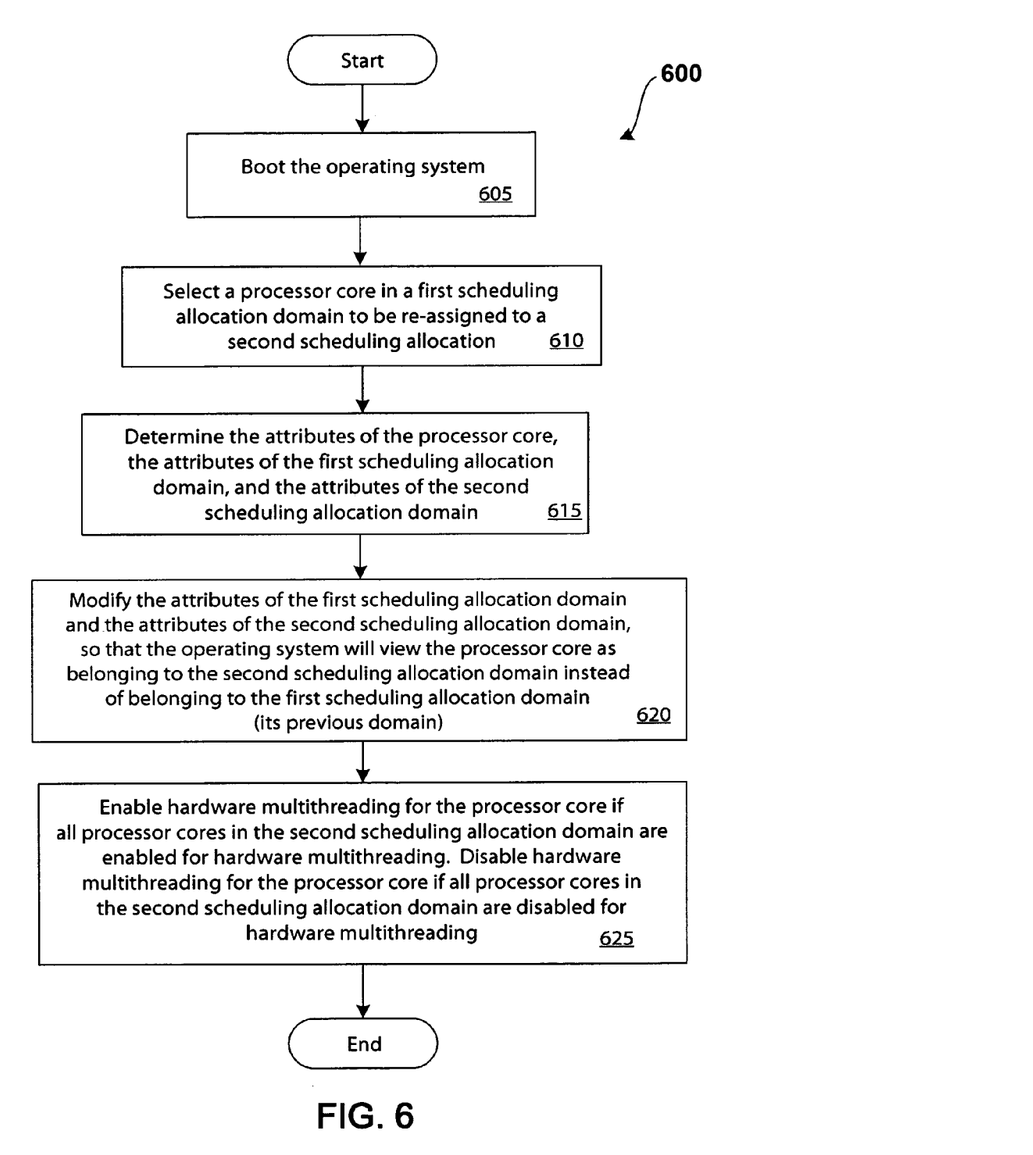
FIG. 6 is a flow diagram of a method in accordance with another embodiment of the invention.

FIG. 6 is a flow diagram of a method 600 in accordance with another embodiment of the invention. In block 605, the operating system is booted. The method 600 permits a processor core to be re-assigned from a scheduling allocation domain to another scheduling allocation domain. In block 610, a system administrator selects a processor core in a first scheduling allocation domain that will be re-assigned to a second scheduling allocation domain. In block 615, the core re-assign engine 460 determines the attributes of the processor core from the first scheduling allocation domain attributes, the attributes of the first scheduling allocation domain, and the attributes of the second scheduling allocation domain. In block 620, the core re-assign engine 460 will modify the attributes of the first scheduling allocation and the attributes of the second scheduling allocation, so that the operating system 420 will view the processor core as belonging to the second scheduling allocation domain instead of belonging to the first scheduling allocation domain (its previous domain). The processor core has now been re-assigned from the first scheduling allocation domain to the second scheduling allocation domain.

In block 625, hardware multithreading is enabled for the processor core if all processor cores in the second scheduling allocation domain are enabled for hardware multithreading. Hardware multithreading is disabled for the processor core if all processor cores in the second scheduling allocation domain are disabled for hardware multithreading.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for dynamic enabling or disabling of hardware multithreading on a processor core, the method comprising:
   using a hardware halt function or a hardware yield function in the processor core in order to enable or disable a first hardware thread that shares the processor core, wherein the first hardware thread is disabled by placing the first hardware thread in a halt state or yield state;
   allowing a second hardware thread to utilize the processor core; and
   in addition to placing the first hardware thread in the halt or yield state, removing the first hardware thread from a view of an operating system by removing information associated with the first hardware thread from at least one data structure associated with the operating system, wherein placing the first hardware thread in the halt state or yield state and removing the first hardware thread from the view of the operating system cause disabling of the hardware multithreading on the processor core, and enabling hardware multithreading on the processor core by removing the first hardware thread from the halt state or yield state and placing the first hardware thread in the view of the operating system by retrieving information associated with the first hardware thread into the at least one data structure associated with the operating system, wherein using the hardware halt function or the hardware yield function permits multithreading enabling and disabling on hardware that does not support dynamic enabling and disabling of hardware threads without operating system reboot or system reset.

2. The method of claim 1, further comprising:
selecting a CPU ID of the second hardware thread that will utilize the processor core after disabling the hardware multithreading on the processor core.

3. The method of claim 1,
wherein enabling hardware multithreading on the processor core allows multiple hardware threads to share the processor core.

4. The method of claim 1, wherein the hardware multithreading is dynamically disabled without performing an operating system reboot or system reset.

5. The method of claim 1, wherein the hardware multithreading is dynamically enabled without performing an operating system reboot or system reset.

6. The method of claim 1, wherein using the hardware halt function or the hardware yield function permits multithreading enabling and disabling on hardware that does not support dynamic enabling and disabling of hardware threads on a per-core basis without operating system reboot or system reset.

7. The method of claim 1, further comprising storing the removed information associated with the first hardware thread in a buffer associated with a multithreading enabling and disabling engine.

8. The method of claim 7, further comprising retrieving the information associated with the first hardware thread and stored in the buffer into the at least one data structure associated with the operating system to place the first hardware thread in the view of the operating system.

9. The method of claim 1, wherein the at least one data structure is part of an operating system kernel layer.

10. An apparatus for dynamic enabling or disabling of hardware multithreading, the apparatus comprising:
a computer system including a processor and an operating system;
wherein the processor includes a processor core with a hardware halt function or a hardware yield function that is invoked for enabling and disabling a first hardware thread that shares the processor core, and wherein the first hardware thread is disabled by placing the first hardware thread in a halt state or yield state, and wherein a second hardware thread is allowed to utilize the processor core, wherein the first hardware thread is further removed from a view of the operating system by removing information associated with the first hardware thread from at least one data structure associated with the operating system, wherein placing the first hardware thread in the halt state or yield state and removing the first hardware thread from the view of the operating system cause disabling of the hardware multithreading on the processor core,
wherein the hardware multithreading is enabled on the processor core by removing the first hardware thread from the halt state or yield state and by placing the first hardware thread in the view of the operating system by retrieving information associated with the first hardware thread into the at least one data structure, and
wherein using the hardware halt function or the hardware yield function permits multithreading enabling and disabling on hardware that does not support dynamic enabling and disabling of hardware threads without system reset or operating system reboot.

11. The apparatus of claim 10, wherein the operating system is executable in the processor to select a CPU ID of the second hardware thread that will utilize the processor core after disabling the hardware multithreading on the processor core.

12. The apparatus of claim 10, wherein enabling the hardware multithreading on the processor core allows multiple hardware threads to share the processor core.

13. The apparatus of claim 10, wherein the hardware multithreading is dynamically disabled without performing a system reset or operating system reboot.

14. The apparatus of claim 10, wherein the hardware multithreading is dynamically enabled without performing a system reset or operating system reboot.

15. The apparatus of claim 10, wherein using the hardware halt function or the hardware yield function permits multithreading enabling and disabling on hardware that does not support dynamic enabling and disabling of hardware threads on a per-core basis without operating system reboot or system reset.

16. The apparatus of claim 10, further comprising:
a multithreading enabling and disabling engine to dynamically enable and disable the hardware multithreading of the processor core; and
a buffer to store the information associated with the first hardware thread that has been removed from the at least one data structure associated with the operating system.

17. The apparatus of claim 16, wherein the multithreading enabling and disabling engine is to retrieve the information associated with the first hardware thread and stored in the buffer into the at least one data structure associated with the operating system to place the first hardware thread in the view of the operating system.

18. The apparatus of claim 17, wherein the at least one structure is part of an operating system kernel layer.

* * * * *